(No Model.)
H. E. DEY.
SECONDARY BATTERY.
No. 418,700. Patented Jan. 7, 1890.
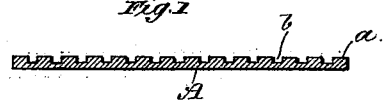
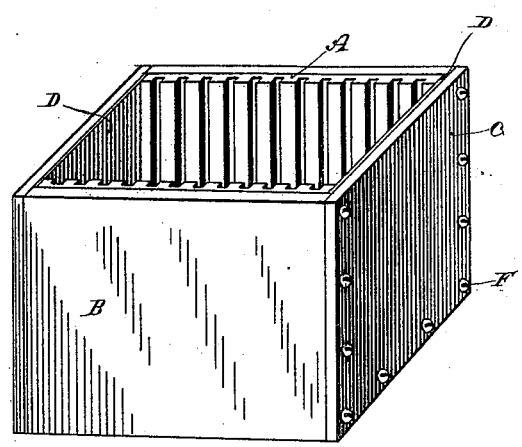
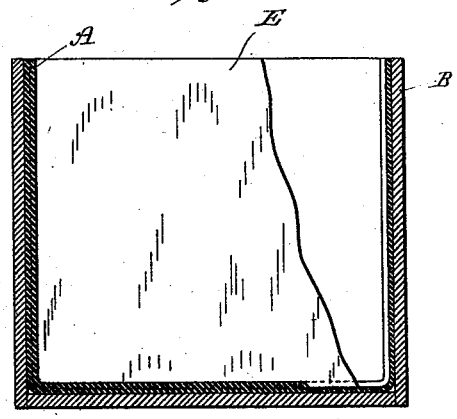
Witnesses:
Raphaël Netter
Robt. F. Gaylord
Inventor
Harry E. Dey
By Duncan, Curtis & Page
Attorneys.

UNITED STATES PATENT OFFICE.

HARRY E. DEY, OF NEW YORK, N. Y., ASSIGNOR TO PHOEBUS H. ALEXANDER, OF HYDE PARK, MASSACHUSETTS.

SECONDARY BATTERY.

SPECIFICATION forming part of Letters Patent No. 418,700, dated January 7, 1890.

Application filed July 29, 1889. Serial No. 319,090. (No model.)

*To all whom it may concern:*

Be it known that I, HARRY E. DEY, a citizen of the United States, residing in New York, in the county and State of New York, have invented certain new and useful Improvements in Storage-Batteries, of which the following is a specification.

In a patent granted to me July 9, 1889, No. 406,822, I have shown and described a storage-battery containing a number of plates insulated from one another and forming practically independent cells, for which the plates themselves make the walls or divisions, so that each plate becomes, by the process of forming, positive on one side and negative on the other. In the construction of the battery referred to the isolation of each of the small cells was effected by the use of independent insulating-strips placed along the edges of the several plates and between the same, and by the further use of a plastic insulating compound between the plates and strips and the walls or sides of the main containing box or cell.

My present invention is an improvement in the construction of battery-cells of this character, whereby the same may be made more economically and easily and the cells as a whole rendered more durable and effective.

In carrying out the invention I first form in any suitable manner, as by molding or rolling, a sheet of insulating material—such as rubber or other material of a similar nature—with parallel grooves or corrugations. These sheets are cut to the width of the battery case or cell and are laid along the bottom and two sides of the interior of the cell. The plates are then passed down into the cell with their edges entering the grooves or corrugations in the insulating-sheet. Then, by any suitable means the plates are clamped together, so that the projections or corrugations of the insulating-sheet will be firmly pressed against the edges of the plates insulating them and forming water-tight compartments. This construction, with other details, I have illustrated in the accompanying drawings.

Figure 1 is a transverse section of the insulating-sheet. Fig. 2 is a perspective view of a cell lined with the corrugated sheets ready to receive the plates. Fig. 3 is a section of a cell with the plates inserted in place.

A sheet A is formed with ribs or corrugations *a* and grooves *b*. These sheets may be formed by rolls or in a mold, and, while preferably of comparatively soft and pliant india-rubber, may be made of any other insulating material that will serve the same purpose.

B is a box or cell, of wood or other proper material, one side of which, as C, is adapted to be secured by screws, so that it may serve as a clamp for binding together the plates and the insulating-sheet.

In the box or cell B, I apply to two opposite sides and the bottom a length of the sheet A, which may be attached to the box by cement, if so desired. I also line the other side of said box with thinner sheets D D, of rubber or like material, which is preferably cemented to the edges of the sheet A. By this means the insulation of the cell is completed. After the sheet A is in position in the cell B, I force down into the grooves the battery-plates E, as shown in Fig. 3. The side C of the cell is then secured to the box by screws F, and when thus secured tightly to the box the plates E should be firmly clamped by the corrugations of the sheet A.

The special character of the battery-plates is largely a matter of choice. It is essential, however, that they have a body of solid material—that is to say, without perforations of any kind which will permit the passage through them of the battery exciters or solutions. Their surfaces, however, may contain recesses or corrugations, or be prepared in any other desired manner to receive and hold the active material. By this construction the spaces between the plates constitute each a complete cell, the walls of which are formed by the plates themselves. Into these cells the electrolyte is poured, and when the battery is suitably formed or charged the electro-motive force which the battery is capable of developing will be very high. Each plate becomes positive on one side and negative on the other, the contents of each of the cells being kept separate from that of the others by the solid body of the plate itself. This is true of all the plates except those at the end, which are affected or rendered active on one side only.

The electrical connections are made in any of the usual ways with the two end plates of the series.

What I claim is—

1. In a secondary or storage battery, the combination, with the plates, of a sheet of flexible insulating material formed with grooves or corrugations, into which the edges of the plates extend, forming separate compartments or cells between each pair of plates, and means for clamping the said sheet and plates together to form water-tight joints, as set forth.

2. The combination, with an outer box or cell, of a lining or inner cell composed of the corrugated or grooved rubber sheet A on the bottom and two opposite sides, and the insulating-sheets on the other sides, battery-plates with their lower and side edges entering the grooves in the sheet A, and means for clamping or binding together the grooved sheets and the plates to form water-tight joints, as set forth.

3. The combination, with the box or cell B, of the corrugated or grooved sheet of rubber applied to the bottom and to opposite sides of the interior of the cell, the plates E, with their lower and side edges entering the grooves in said sheet, and means for clamping or binding together the sheet and the plates to form water-tight joints, as set forth.

In testimony whereof I have hereunto subscribed my name this 26th day of July, A. D. 1889.

HARRY E. DEY.

Witnesses:
 PARKER W. PAGE,
 CAROLINE E. DAVIDSON.